United States Patent
Nobuoka

(10) Patent No.: US 8,280,163 B2
(45) Date of Patent: Oct. 2, 2012

(54) IMAGE PROCESSING TO SUPPRESS COLOR BLUR

(75) Inventor: Kosuke Nobuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 12/784,846

(22) Filed: May 21, 2010

(65) Prior Publication Data

US 2010/0303352 A1 Dec. 2, 2010

(30) Foreign Application Priority Data

May 28, 2009 (JP) ................................ 2009-129196
Feb. 24, 2010 (JP) ................................ 2010-039067

(51) Int. Cl.
*G06K 9/00* (2006.01)

(52) U.S. Cl. ....................................... 382/167

(58) Field of Classification Search ........................ None
See application file for complete search history.

(56) References Cited

U.S. PATENT DOCUMENTS

| | | | | |
|---|---|---|---|---|
| 5,398,124 | A * | 3/1995 | Hirota | 358/530 |
| 5,473,372 | A * | 12/1995 | Nobuoka et al. | 348/254 |
| 6,853,400 | B1 | 2/2005 | Matama | |
| 6,914,628 | B1 | 7/2005 | Kuwata et al. | |
| 7,489,345 | B2 * | 2/2009 | Fukumoto | 348/222.1 |
| 2001/0045988 | A1 * | 11/2001 | Yamauchi et al. | 348/273 |
| 2005/0093992 | A1 * | 5/2005 | Fukumoto | 348/222.1 |
| 2006/0098253 | A1 * | 5/2006 | Masuno et al. | 358/518 |
| 2006/0164700 | A1 * | 7/2006 | Hayashi | 358/518 |
| 2007/0097267 | A1 * | 5/2007 | Sakurai et al. | 348/571 |
| 2007/0098261 | A1 * | 5/2007 | Kojima et al. | 382/167 |
| 2008/0056567 | A1 * | 3/2008 | Kwon et al. | 382/168 |
| 2008/0137947 | A1 * | 6/2008 | Sawada et al. | 382/167 |
| 2009/0129696 | A1 * | 5/2009 | Komatsu et al. | 382/264 |
| 2009/0153696 | A1 * | 6/2009 | Suwabe et al. | 348/223.1 |

FOREIGN PATENT DOCUMENTS

| | | |
|---|---|---|
| JP | 2000-076428 A | 3/2000 |
| JP | 2003-102027 A | 4/2003 |

* cited by examiner

*Primary Examiner* — Wenpeng Chen
*Assistant Examiner* — Feng Niu
(74) *Attorney, Agent, or Firm* — Canon U.S.A., Inc. I.P. Division

(57) ABSTRACT

When determining an area in which color blur occurs from an image, there may be an area where color blur suppression is performed in an area even though color blur does not occur, and the area becomes more noticeable or less noticeable depending on a degree of gamma correction processing. To solve this problem, an image processing apparatus obtains a color blur suppression coefficient based on a gradient value obtained from the image, performs color blur suppression on the image data using the color blur suppression coefficient, and changes the color blur suppression coefficient corresponding to the gradient value according to brightness.

10 Claims, 10 Drawing Sheets

IMAGE PROCESSING TO SUPPRESS COLOR BLUR

BACKGROUND OF THE INVENTION

1. Field of the Invention

The present invention relates to an image processing apparatus and an image processing method, and more specifically to an image processing apparatus, an image processing method, and a program for correcting chromatic aberration caused by optical factors to suppress color blur.

2. Description of the Related Art

Digital video cameras and digital cameras in recent years can obtain high quality images by employing an image sensor with a large number of pixels.

On the other hand, due to miniaturization of pixels and a small-sized lens, color blur, which is an influence of chromatic aberration caused by differences of image forming positions for each wavelength of light, appears easily in an image.

Conventionally, as a technique for suppressing color blur in a captured image, various methods have been proposed.

For example, in Japanese Patent Application Laid-Open No. 2000-076428, a technique is discussed in which a lens used to capture an image is recognized, aberration information is read to generate a correction parameter, and coordinates of a color signal to be corrected is moved according to the correction parameter.

However, color blur characteristics change in a complex manner according to an image height position from the center of the optical axis to a target pixel, a position of a zoom lens, an opening diameter of an iris, and a position of a focus lens. Therefore, in a configuration discussed in Japanese Patent Application Laid-Open No. 2000-076428 in which lens aberration information is read, the aberration information needs to be stored for each of the image height positions, the positions of the zoom lens, the opening diameters of the iris, the positions of the focus lens, and types of lenses. Hence, the capacity of a memory storing these aberration information items needs to be large.

Therefore, a technique is proposed in which, instead of reading the lens aberration information stored in advance, an area where color blur is expected to occur on the image is extracted, and color blur is suppressed in the area. For example, in Japanese Patent Application Laid-Open No. 2003-102027, a technique is discussed in which a difference between two color components in an image is detected, an area where the difference is large is determined to be an area where color blur occurs, and the color blur is suppressed.

However, when, instead of reading the stored lens aberration information, an area is determined where color blur occurs on the image, it is difficult to completely eliminate a wrong determination. For example, in a configuration discussed in Japanese Patent Application Laid-Open No. 2003-102027, in which a difference between two color components is detected, if a subject image has a pattern having features which may be seen as color blur, even when color blur does not occur, the pattern may be determined to be color blur. As a result, even when an area does not have color blur, the color density of the area may be decreased, or the pixels in the area may be replaced by nearby pixels.

This is not limited to the configuration as discussed in Japanese Patent Application Laid-Open No. 2003-102027. If an area where color blur occurs and a degree of the color blur are determined from a brightness component and a color component of the image, there is a problem that the determination result is affected by the subject image.

To avoid such a situation, it is conceivable to set a strict condition to determine an area of color blur. However, if a strict condition to determine an area of color blur is simply set, an area where color blur really occurs but which is not determined to be an area of color blur increases, so that this does not contribute to improving image quality.

In addition, by performing gamma correction processing on an image on which color blur suppression processing has been performed, the gradient may change. As a result, an area in which color blur does not occur but color density is suppressed by wrong determination, or an area in which color blur occurs but the color blur is not suppressed, may become more noticeable.

SUMMARY OF THE INVENTION

The present invention is directed to an image processing apparatus and an image processing method which can effectively correct color blur while suppressing an effect of wrong correction even when the wrong correction occurs.

According to an aspect of the present invention, an image processing apparatus includes a gradient detection unit configured to detect a gradient value from an image, a suppression coefficient calculation unit configured to calculate a suppression coefficient based on the gradient value, a suppression unit configured to suppress color blur in a suppression target area in the image based on the suppression coefficient, and a gamma correction unit configured to perform gamma correction according to set gamma correction characteristics set for the image, wherein the gamma correction characteristics are set such that a ratio of a change width of an output signal to a change width of an input signal when a brightness signal level is in a first range is set larger than a ratio of a change width of an output signal to a change width of an input signal when the brightness signal level is in a second range, and the suppression coefficient calculation unit calculates the suppression coefficient such that color blur only in the suppression target area is suppressed when the gradient value exceeds a threshold value, and sets the threshold value such that a range of the gradient value required to suppress color blur in an area where the brightness signal level is included in the second range in the image is narrower than a range of the gradient value required to suppress color blur in an area where the brightness signal level is included in the first range in the image.

According to another aspect of the present invention, an image processing apparatus includes a gradient detection unit configured to detect a gradient value from an image, a suppression coefficient calculation unit configured to calculate a suppression coefficient based on the gradient value, a suppression unit configured to suppress color blur in a suppression target area in the image based on the suppression coefficient, and a gamma correction unit configured to perform gamma correction according to set gamma correction characteristics set for the image, wherein the gamma correction characteristics are set such that a ratio of a change width of an output signal to a change width of an input signal when a brightness signal level is in a first range is larger than a ratio of a change width of an output signal to a change width of an input signal when the brightness signal level is in a second range, and the suppression coefficient calculation unit sets the suppression coefficient such that a degree of color blur suppression in an area where the brightness signal level is included in the second range in the image is stronger than a degree of color blur suppression in an area where the brightness signal level is included in the first range in the image even when the gradient value is the same.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
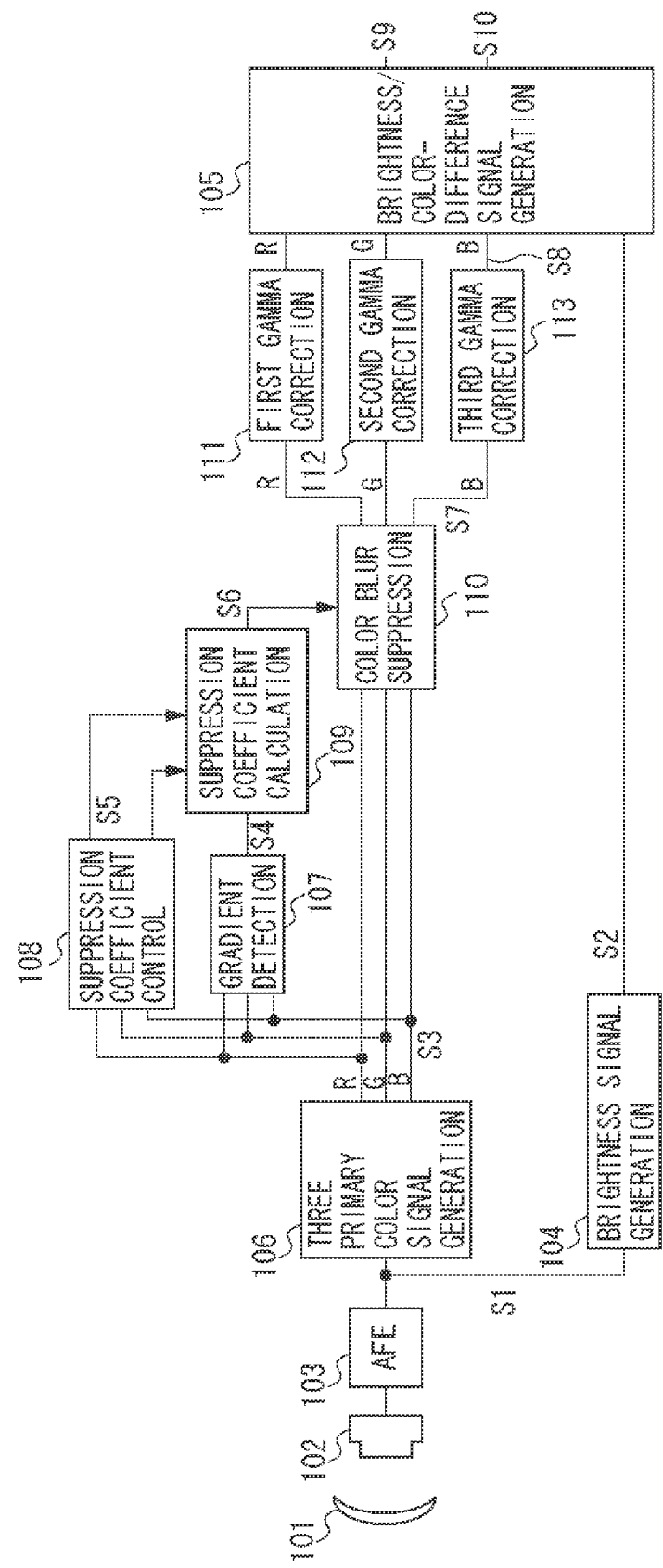
FIG. 1 is a block diagram illustrating a configuration example of a digital video camera as an image processing apparatus according to a first exemplary embodiment of the present invention.

FIG. 1 is a block diagram illustrating a configuration example of a digital video camera as an image processing apparatus according to a first exemplary embodiment of the present invention.

An image forming optical system 101 includes a lens unit including a zoom lens and a focus lens. An image sensor 102 is equipped with a color filter of a complementary color mosaic arrangement or a primary color Bayer arrangement. The image sensor 102 photoelectrically converts a subject image to generate an image signal. The image sensor 102 also includes a charge coupled device (CCD) sensor or a complementary metal oxide semiconductor (CMOS) sensor. In the present exemplary embodiment, a CCD equipped with a color filter of the Bayer arrangement of primary colors R (red), G (green), and B (blue) is used.

An analog front end (hereinafter referred to as AFE) 103 includes an A/D converter and a double correlation sampling circuit. A brightness signal generation unit 104 includes a gamma correction circuit and a contour enhancement circuit.

A brightness/color-difference signal generation unit 105 generates a brightness signal and a color-difference signal. A three primary color signal generation unit 106 performs synchronization processing on an image signal output from the AFE, and obtains output values of color signals of R, G, and B for each pixel. A gradient detection unit 107 detects a gradient value in an area to be observed in the image.

A suppression coefficient control unit 108 sets a first suppression coefficient control parameter and a second suppression coefficient control parameter according to a signal output from the three primary color signal generation unit 106. A suppression coefficient calculation unit 109 calculates a suppression coefficient according to the gradient value output from the gradient detection unit 107, and the first suppression coefficient control parameter and the second suppression coefficient control parameter output from the suppression coefficient control unit 108.

A color blur suppression unit 110 performs color blur suppression processing according to the suppression coefficient output from the suppression coefficient calculation unit 109. A first gamma correction unit 111 performs gamma correction on an R signal output from the color blur suppression unit 110. A second gamma correction unit 112 performs gamma correction on a G signal output from the color blur suppression unit 110. A third gamma correction unit 113 performs gamma correction on a B signal output from the color blur suppression unit 110.

Next, an operation of the digital video camera of the present exemplary embodiment will be described.

The subject image formed on the image sensor 102 through the image forming optical system 101 is photoelectrically converted into an image signal of an electrical signal. The image signal is converted into a digital signal in the AFE 103, and output as a 12-bit digital image signal S1. The digital image signal S1 is a single color signal corresponding to an arrangement pattern of the color filter of the image sensor 102, and transmitted to the brightness signal generation unit 104 and the three primary color signal generation unit 106.

For example, the brightness signal generation unit 104 extracts only the G signal of the digital image signal S1, and performs adaptive interpolation processing on the G signal to generate a brightness signal. Although not illustrated in FIG. 1, the brightness signal generation unit 104 performs contour enhancement processing and gamma correction processing for a brightness signal on the generated brightness signal, and outputs the processed signal as a brightness signal S2. The brightness signal S2 is input into the brightness/color-difference signal generation unit 105.

On the other hand, the three primary color signal generation unit 106 performs synchronization processing on the digital image signal output from the AFE 103, and associates the R, G, and B signals with all pixels in the image sensor. In the three primary color signal generation unit 106, since the density of a G color filter is higher than the densities of R and B filters in the Bayer arrangement, G signal whose band is matched to the bands of R and B signals is generated in the synchronization processing. Therefore, the G signal generated here has a band narrower than that of the brightness signal S2 generated in the brightness signal generation unit 104.

When an on-axis chromatic aberration is generated in the image forming optical system 101, the on-axis chromatic aberration is reproduced in a three primary color signal S3 output from the three primary color signal generation unit 106 because image forming depths on the light receiving surface of the image sensor 102 are different for each wavelength of light. It is known that such color blur is noticeable in an area having a steep gradient in a subject image.

Therefore, in the present exemplary embodiment, in the gradient detection unit 107, gradient information S4 of the 12-bit subject image is extracted by using a publicly known gradient extraction filter such as a Sobel filter in a range of 3×3 pixels, 5×5 pixels, and the like, at the center of which is a target pixel for color blur suppression. The gradient information S4 is used as a determination criterion of color blur. The gradient information S4 may be a value generated by processing each gradient of R, G, and B signals, such as an average value, a maximum value, or a minimum value of each gradient of R, G, and B signals, or a value in which these values are combined with a predetermined weighting.

Although, as described above, it is true that the color blur due to the on-axis chromatic aberration is noticeable in an area having a steep signal gradient in the subject image, the color blur also occurs in an area having a gentle signal gradient in the subject image. Although the color blur in the area having a gentle signal gradient is not as noticeable as that in the area having a steep signal gradient in the subject image, the color blur can be visible, and recognized as image quality deterioration.

However, it is difficult to completely separate the color blur due to the on-axis chromatic aberration from color edge in the subject image by analyzing the image signal. Therefore, when suppressing the color blur due to the on-axis chromatic aberration, the suppressing operation needs to be performed by considering protection of the color edge in the subject image.

In the present exemplary embodiment, the suppression coefficient control unit 108 and the suppression coefficient calculation unit 109 in FIG. 1 are configured to balance the suppression of the color blur and the protection of the color edge in the subject image. The details of the above will be described below. However, first, an operation of the color blur suppression processing according to the present exemplary embodiment will be described.

The color blur suppression unit 110 performs color blur suppression for each suppression target area according to the suppression coefficient S6 calculated by the suppression coefficient calculation unit 109, and outputs a color blur suppressed signal S7 including 12-bit R, G, and B signals. In the color blur suppression processing, for example, a color-difference signal of a pixel on which the color blur suppression is to be performed is suppressed, and the color of the pixel is achromatized, so that the color blur becomes unnoticeable.

Figure 2:
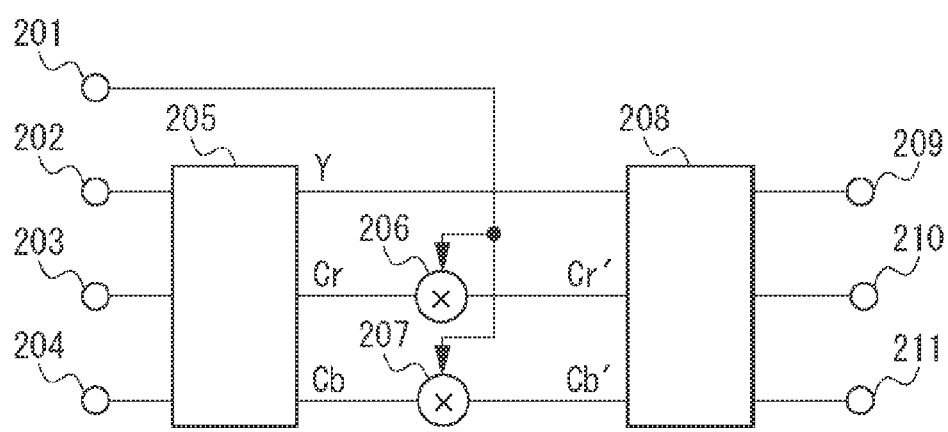
FIG. 2 illustrates a configuration of a color blur suppression unit in FIG. 1.

FIG. 2 illustrates a configuration of the color blur suppression unit 110 in FIG. 1.

In FIG. 2, an input terminal 201 inputs the suppression coefficient S6 calculated by the suppression coefficient calculation unit 109. An input terminal 202 inputs the R signal of the color signals synchronized in the three primary color signal generation unit 106. In a similar way, an input terminal 203 inputs the G signal. An input terminal 204 inputs the B signal. A brightness/color-difference conversion matrix 205 converts the input R, G, and B signals into a brightness signal, a first color-difference signal, and a second color-difference signal.

A first color-difference gain adjustment unit 206 adjusts an output level of the first color-difference signal output from the brightness/color-difference conversion matrix 205 according to the suppression coefficient. A second color-difference gain adjustment unit 207 adjusts an output level of the second color-difference signal output from the brightness/color-difference conversion matrix 205 according to the suppression coefficient. A three primary color conversion matrix 208 converts the brightness signal, the first color-difference signal, and the second color-difference signal into the R, G, and B signals. An output terminal 209 outputs the R signal generated in the three primary color conversion matrix 208. An output terminal 210 outputs the G signal generated in the three primary color conversion matrix 208. An output terminal 211 outputs the B signal generated in the three primary color conversion matrix 208.

As illustrated in FIG. 2, the R, G, and B signals output from the three primary color signal generation unit 106 are input into the input terminals 202 to 204, and converted into the brightness signal Y, the first color-difference signal Cr, and the second color-difference signal Cb by the brightness/color-difference conversion matrix 205.

The first color-difference signal Cr and the second color-difference signal Cb are multiplied by the suppression coefficient S6 output from the suppression coefficient calculation unit 109 by multipliers (first color-difference gain adjustment unit) 206 and (second color-difference gain adjustment unit) 207, and a first suppressed color-difference signal Cr' and a second suppressed color-difference signal Cb' are obtained. In this way, by adjusting color difference components of a target pixel using the suppression coefficient, achromatization of the target pixel is realized. The first suppressed color-difference signal Cr', the second suppressed color-difference signal Cb', and the brightness signal Y are converted into the color blur suppressed signal S7 including 12-bit R, G, and B signals by the three primary color conversion matrix 208, and output from the output terminals 209 to 211.

The suppression coefficient S6 is a value between 0 and 1. The value 0 indicates a state in which the color blur is completely suppressed, and the value 1 indicates a state in which the color blur is not suppressed at all.

Figure 3:
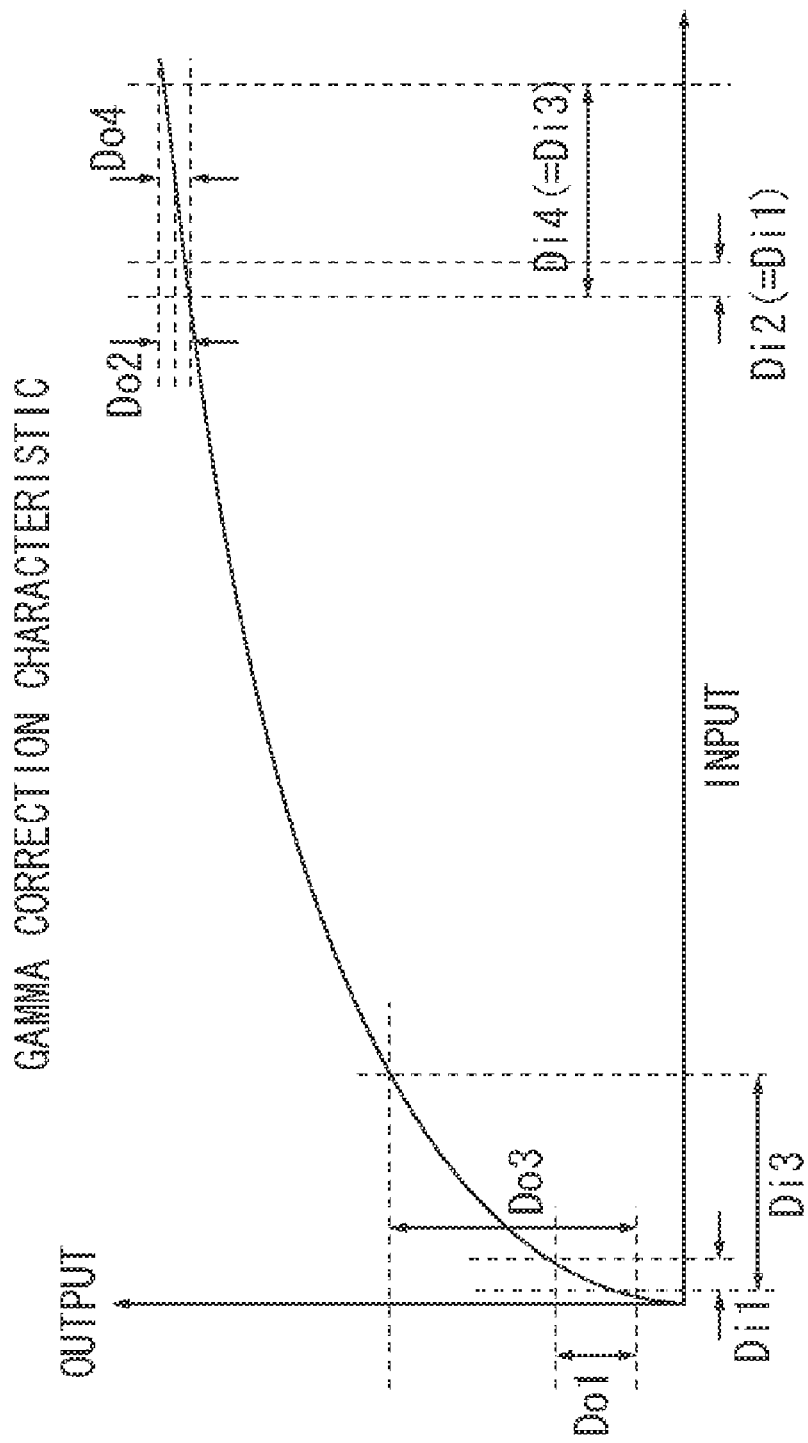
FIG. 3 illustrates an example of gamma correction characteristics in gamma correction units in FIG. 1.

Of the color blur suppressed signal S7, the R signal, the G signal, and the B signal are level-converted respectively in the first gamma correction unit 111, the second gamma correction unit 112, and the third gamma correction unit 113 from input signals to output signals according to nonlinear conversion characteristics illustrated in FIG. 3. The signals on which the gamma correction is performed are input into the brightness/color-difference signal generation unit 105 as a gamma corrected signal S8 including 10-bit R, G, and B signals. The brightness/color-difference signal generation unit 105 generates the brightness signal and the color-difference signal again from the gamma corrected signal S8. To obtain an image in a higher resolution, the brightness/color-difference signal generation unit 105 combines the generated brightness signal and the wideband brightness signal S2 generated in the brightness signal generation unit 104 to output a new brightness signal S9 and a color-difference signal S10.

The brightness signal S9 and the color-difference signal S10 are stored in a recording medium (not shown), or displayed on a display apparatus (not shown) as a monitor image, which can be seen by a user. The color blur suppression processing by the color blur suppression unit 110 requires "bit accuracy", so that the color blur suppression processing is performed before the gamma correction is performed in which the brightness signal gradation level is suppressed.

The method for balancing the suppression of the color blur and the protection of the color edge in the subject image in the suppression coefficient control unit 108 and the suppression coefficient calculation unit 109 is described in detail below.

As described above, the brightness signal S9 and the color-difference signal S10 on which the nonlinear level conversion is performed by the first, second, and third gamma correction units 111, 112, and 113 become a video signal which can be seen by a user. Therefore, when balancing the suppression of the color blur and the protection of the color edge in the subject image, characteristics of the gamma correction performed by the first, second, and third gamma correction units 111, 112, and 113 should be considered. More specifically, in a configuration in which the suppression coefficient is calculated based on the gradient information S4 of the subject image, even when the gradient information S4 has the same value, there is a difference in the gradients that are actually seen by a user as described below depending on whether the gradient is in a high brightness area or in a low brightness area.

FIG. 3 is illustrates an example of the gamma correction characteristics in the gamma correction units 111 to 113 in FIG. 1.

Di1 in FIG. 3 represents a width of a signal level change in the low gradient area in the low brightness area. Di3 represents a width of a signal level change in the high gradient area in the low brightness area. Do1 represents a width of a signal level change in a gradient area which is actually seen by a user after the gamma correction is performed on the Di1. Do3 represents a width of a signal level change in a gradient area which is actually seen by a user after the gamma correction is performed on the Di3.

On the other hand, Di2 in FIG. 3 represents a width of a signal level change in the low gradient area in the high brightness area. Di4 represents a width of a signal level change in the high gradient area in the high brightness area. Do2 represents a width of a signal level change in a gradient area which is actually seen by a user after the gamma correction is performed on the Di2. Do4 represents a width of a signal level change in a gradient area which is actually seen by a user after the gamma correction is performed on the Di4.

In the low brightness area, the gradient of the image signal seen by a user after the suppression processing is performed, is more enhanced by the gamma correction processing than the gradient of the image signal on which the suppression processing is performed by the color blur suppression unit 110. On the other hand, in the high brightness area, the gradient of the image signal seen by a user after the suppression processing, becomes unnoticeable compared to the gradient of the image signal on which the suppression processing is performed by the color blur suppression unit 110 because the image signal is suppressed by the gamma correction processing.

When this phenomenon is considered, in the high brightness area, the gradient level of the color edge of the subject is suppressed and originally difficult to see, and hence it can be said that the user hardly recognizes that the color edge is erased by the color blur suppression. On the other hand, when even a slight color is added to the subject which should be achromatic, the color blur phenomenon itself is easily recognized as image quality deterioration by the user even though the level of the gradient is suppressed in the high brightness area. In view of the above situation, the strong color blur suppression should be performed in the high brightness area.

On the other hand, in the low brightness area, the gradient is enhanced in both the subject color edge and the color blur, so that the user can easily recognize both of them. Therefore, if the area in which the color edge is originally present is achromatized by wrong color blur suppression processing, unlike the high brightness area in which the level is suppressed, the low brightness area is bothersome to a user. From the viewpoint of image quality deterioration, a color loss in which the color edge is achromatized can be recognized more easily by the user than the color blur remaining in the image, so that the color loss is more undesirable than the color blur. Therefore, in the low brightness area, it is desirable not to perform the color blur suppression processing, or to control the strength of the color blur suppression processing.

The suppression coefficient calculation unit 109 calculates the suppression coefficient S6 by using the gradient information S4 provided from the gradient detection unit 107 and a suppression characteristic control parameter S5 provided from the suppression coefficient control unit 108. The suppression coefficient S6 is calculated by the following formulas (1) to (3).

When S4<Th1, $$S6=1 \quad (1)$$

When Th1≦S4<Th2, $$S6=Th2/(Th2-Th1)-S4/(Th2-Th1) \quad (2)$$

When Th2≦S4

$$S6=0 \quad (3)$$

In the formulas (1) to (3), Th1 and Th2 are respectively the first suppression coefficient control parameter and the second suppression coefficient control parameter which constitute the suppression characteristic control parameter S5. According to these formulas, when the gradient information S4 is smaller than the first threshold value Th1, the suppression coefficient S6 is set to 1 and the color-difference signal is output without changing the value thereof, so that the color blur suppression is not performed in the area. When the gradient information S4 is greater than or equal to the second threshold value Th2, the suppression coefficient S6 is set to 0 and the color-difference signal is output as 0, so that the color blur suppression is performed to completely achromatize the image signal in the area. When the gradient information S4 is greater than or equal to the first threshold value Th1, and smaller than the second threshold value Th2, by the formula (2), the larger the value of the gradient information S4 is, the more strongly the color blur suppression is performed to correct the color blur (color approaches to achromatic color). In other words, according to the formula (2), compared with the suppression coefficient when the value of the gradient information S4 is a first value, the suppression coefficient is nearer to 0 when the value of the gradient information S4 is a second value that is greater than the first value.

Figure 4:
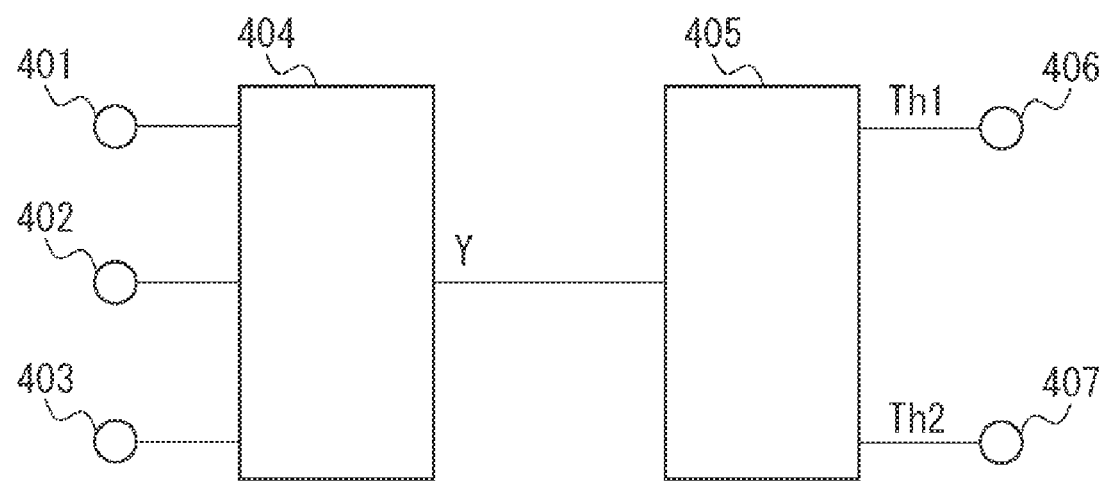
FIG. 4 illustrates a configuration of a suppression coefficient control unit in FIG. 1.

FIG. 4 illustrates a configuration of the suppression coefficient control unit 108 in FIG. 1. An input terminal 401 inputs the R signal of the color signals synchronized in the three primary color signal generation unit 106. In a similar way, an input terminal 402 inputs the G signal, and an input terminal 403 inputs the B signal. A brightness level calculation unit 404 calculates the level of the brightness signal from the signals input from the input terminals 401 to 403. A determination table 405 sets the first suppression coefficient control parameter and the second suppression coefficient control parameter, which will be described below, according to the brightness level calculated by the brightness level calculation unit 404. An output terminal 406 outputs the first suppression coefficient control parameter, and an output terminal 407 outputs the second suppression coefficient control parameter.

Figure 5:
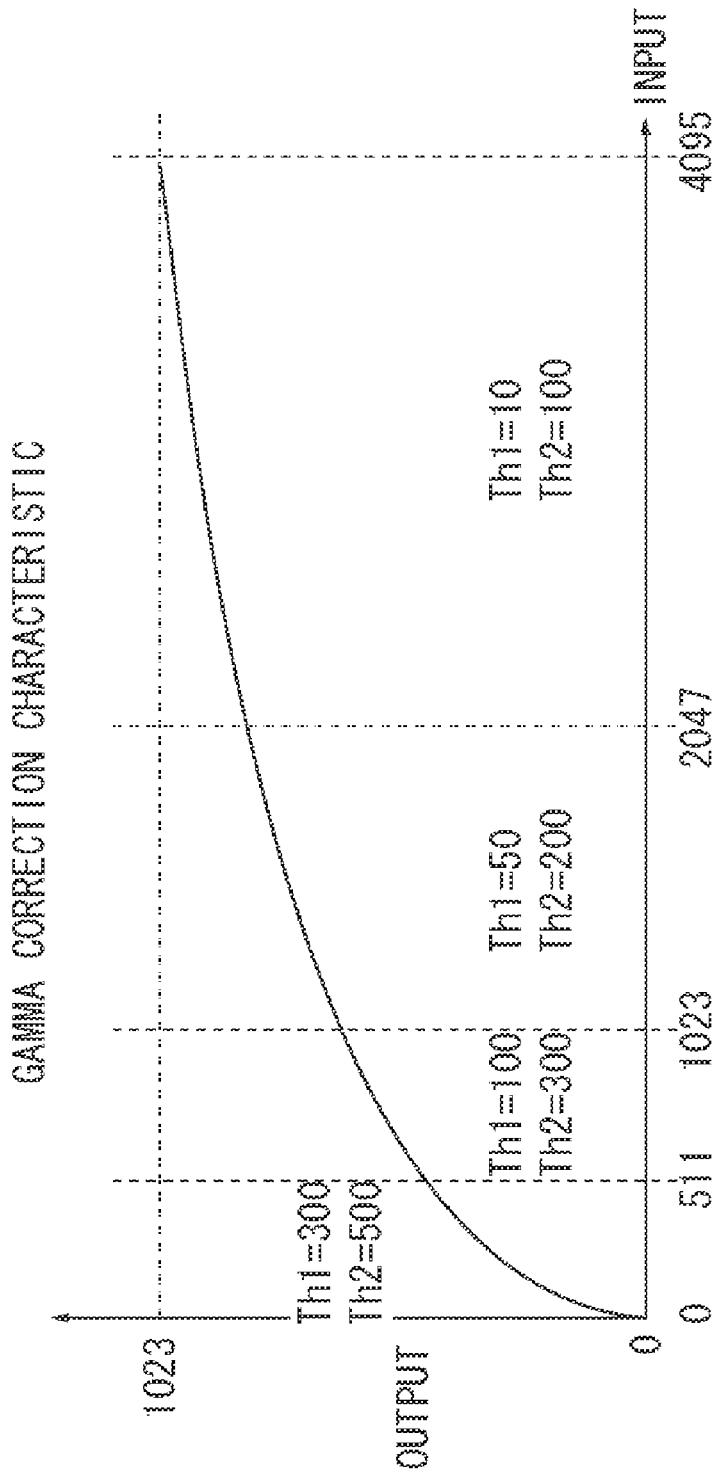
FIG. 5 illustrates a relationship among a level of brightness signal, a first suppression coefficient control parameter, and a second suppression coefficient control parameter which are set in a determination table in FIG. 4.

FIG. 5 is illustrates a relationship among the level of the brightness signal, the first suppression coefficient control parameter, and the second suppression coefficient control parameter which are set in the determination table 405 in FIG. 4.

In the present exemplary embodiment, in the configuration illustrated in FIG. 4, according to the characteristics illustrated in FIG. 5, the first threshold value Th1 and the second threshold value Th2 are changed depending on where the level of the brightness signal is included with respect to a first range, a second range, a third range, and a fourth range. As described above, in the low brightness area in which the degree of the suppression of the brightness signal level is small, in order to hinder the color blur suppression, the first threshold value Th1 and the second threshold value Th2 are set to high values, compared with in the high brightness area in which the degree of the suppression of the brightness signal level is large. In the high brightness area in which a ratio of a change width of the output signal to a change width of the input signal is relatively small, in order to facilitate the color blur suppression, the first threshold value Th1 and the second threshold value Th2 are set to low values, compared with in the low brightness area. In other words, the first threshold value Th1 and the second threshold value Th2 are set so that the smaller the ratio of the change width of the output signal to the change width of the input signal is, the narrower the range of the gradient value in which the color blur suppression is not performed (the suppression coefficient is 1).

In FIG. 4, the brightness level calculation unit 404 calculates the level of a brightness signal Y (12-bit digital signal) from the three primary color signal S3 of the R, G, and B signals input from the input terminals 401 to 403 by using, for example, formula (4).

$$Y=0.3R+0.59G+0.11B \quad (4)$$

The determination table 405 sets the first threshold value Th1 and the second threshold value Th2 according to the level of the brightness signal Y based on the characteristics illustrated in FIG. 5. More specifically, when the level of the brightness signal Y is 12-bit and in a range from 0 to 511, the first threshold value Th1 is set to 300, and the second threshold value Th2 is set to 500. When the level of the brightness signal Y is in a range from 512 to 1023, the first threshold value Th1 is set to 100, and the second threshold value Th2 is set to 300. When the level of the brightness signal Y is in a range from 1024 to 2047, the first threshold value Th1 is set to 50, and the second threshold value Th2 is set to 200. When the level of the brightness signal Y is in a range from 2048 to 4095, the first threshold value Th1 is set to 10, and the second threshold value Th2 is set to 100.

Although not illustrated in FIG. 5, the first threshold value Th1 may be set to a fixed value of 30, and as the level of the brightness signal Y increases, only the second threshold value Th2 may decrease from 500 to 300 to 200 to 100. In this way, in a certain range of the gradient value, even when the gradient value is the same, the higher the brightness of the area is, the more strongly the color blur suppression processing is applied, so that the degree of suppression of color difference component increases.

As described above, according to the present exemplary embodiment, considering the width of the gradient change which is actually seen by a user after the gamma correction processing is performed, the color blur suppression is curbed in the low brightness area, and the color blur suppression is actively performed in the high brightness area. By employing the above configuration, the suppression of the color blur in the low gradient area and the protection of the color edge in the subject image can be balanced, and the color blur suppression processing with less failure can be realized.

Figure 6:
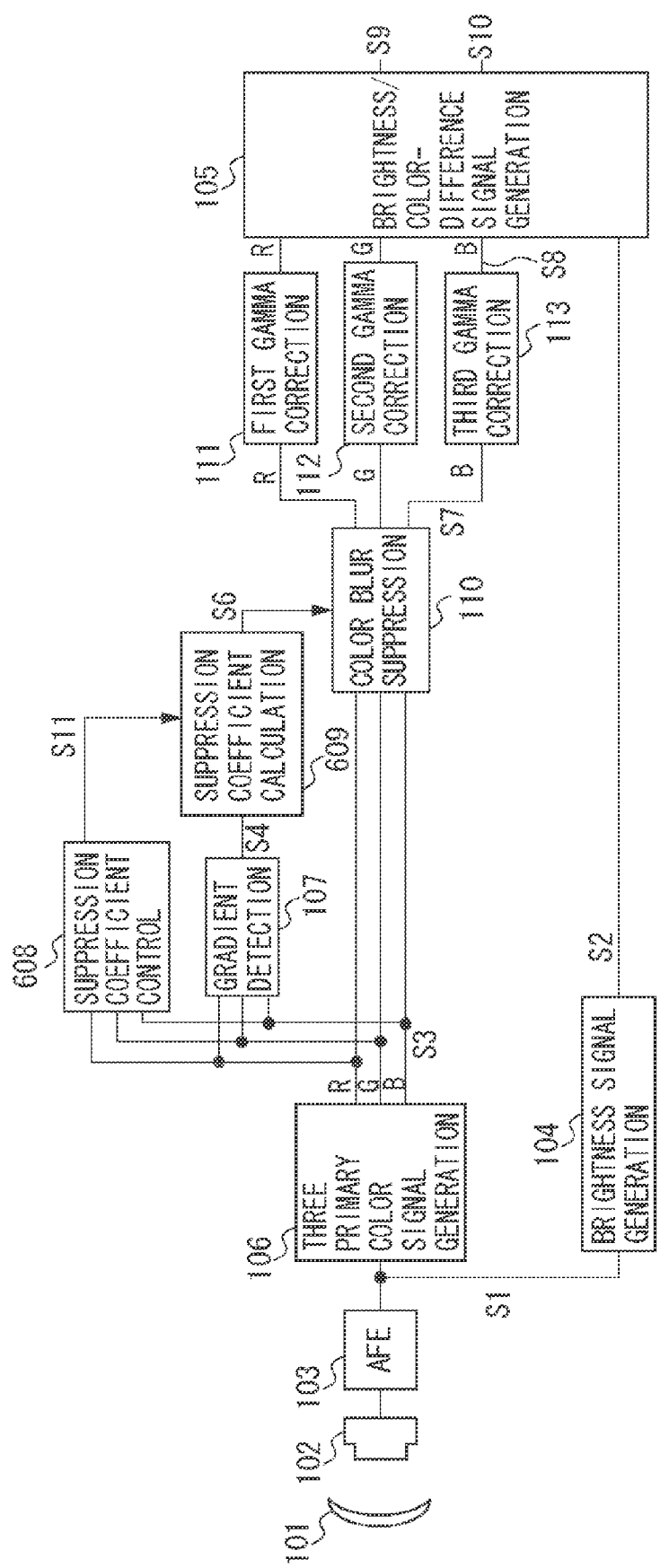
FIG. 6 is a block diagram illustrating a configuration example of a digital video camera as an image processing apparatus according to a second exemplary embodiment of the present invention.

FIG. 6 is a block diagram illustrating a configuration example of a digital video camera as an image processing apparatus according to a second exemplary embodiment of the present invention.

A configuration from the image forming optical system 101 to the gradient detection unit 107 in FIG. 6 is the same as the configuration from the image forming optical system 101 to the gradient detection unit 107 in FIG. 1. A configuration from the color blur suppression unit 110 to the third gamma correction unit 113 in FIG. 6 is the same as the configuration from the color blur suppression unit 110 to the third gamma correction unit 113 in FIG. 1. In the present exemplary embodiment, a configuration of the suppression coefficient control unit 608 and the suppression coefficient calculation unit 609 is different from the configuration of the suppression coefficient control unit 108 and the suppression coefficient calculation unit 109 in FIG. 1, and hence the difference will be mainly described.

Figure 7:
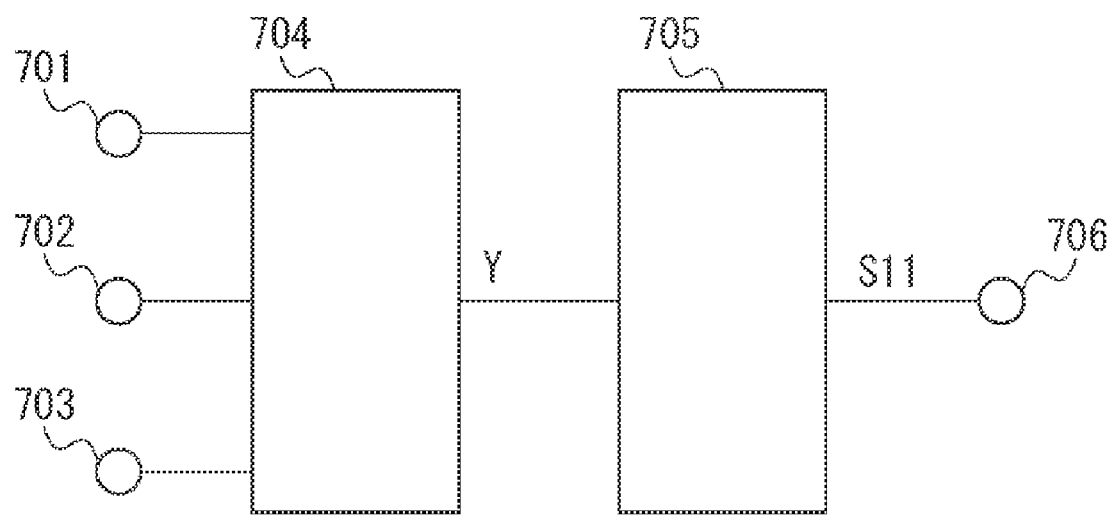
FIG. 7 illustrates a configuration of a suppression coefficient control unit in FIG. 6.

FIG. 7 illustrates a configuration of the suppression coefficient control unit 608 in FIG. 6.

An input terminal 701 inputs the R signal of the color signals synchronized in the three primary color signal generation unit 106. In a similar way, an input terminal 702 inputs the G signal, and an input terminal 703 inputs the B signal. A brightness level calculation unit 704 calculates the level of the brightness signal from the signals input from the input terminals 701 to 703. A brightness conversion circuit 705 has gamma correction characteristics similar to those of the gamma correction units 111 to 113 in FIG. 1. An output terminal 706 outputs the brightness signal converted in the brightness conversion circuit 705 as the first suppression coefficient control parameter.

Figure 8:
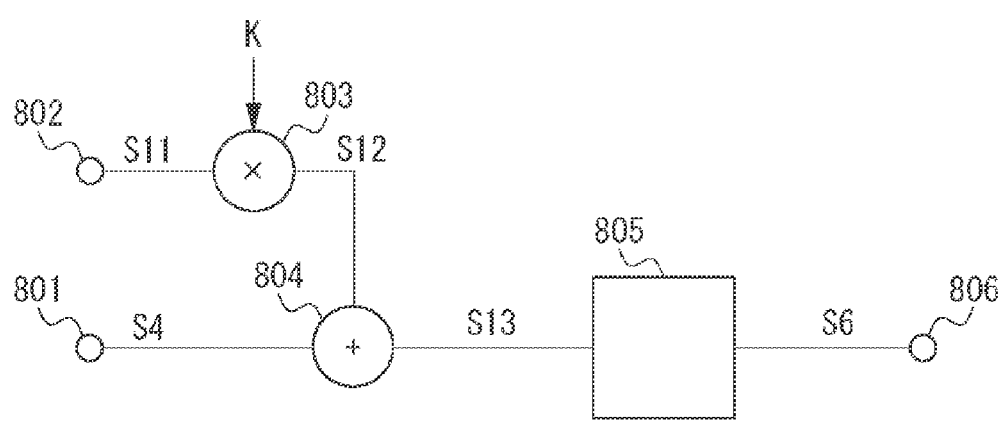
FIG. 8 illustrates a configuration of a suppression coefficient calculation unit in FIG. 6.

FIG. 8 is a diagram illustrating a configuration of the suppression coefficient calculation unit 609 in FIG. 6.

In FIG. 8, an input terminal 801 inputs the gradient information S4 output from the gradient detection unit 107. An input terminal 802 inputs the first suppression coefficient control parameter S11 output from the suppression coefficient control unit 608. A multiplier circuit 803 multiplies the first suppression coefficient control parameter S11 by a setting gain K and outputs the second suppression coefficient control parameter S12. The setting gain K may be a fixed value, or may be set externally by a microcomputer or the like (not shown in FIG. 8). An adder circuit 804 adds the gradient information S4 to the second suppression coefficient control parameter S12 and outputs an adjustment gradient S13. A conversion table 805 sets the suppression coefficient S6 based on the adjustment gradient S13. An output terminal 806 outputs the suppression coefficient S6.

Figure 9:
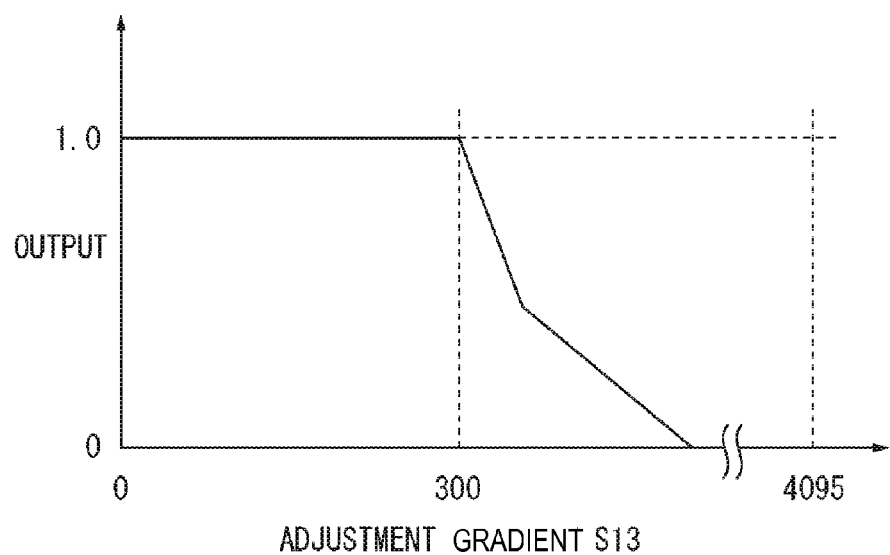
FIG. 9 illustrates conversion characteristics of a suppression coefficient based on an adjustment gradient in a conversion table in FIG. 8.

FIG. 9 illustrates conversion characteristics of the suppression coefficient S6 based on the adjustment gradient S13 in the conversion table 805 in FIG. 8.

In FIG. 9, the horizontal axis indicates the adjustment gradient S13, and the vertical axis indicates the suppression coefficient S6. In the present exemplary embodiment, since the gradient information S4 is 12-bit, the adjustment gradient S13 is represented by a 12-bit digital signal, and the range thereof is from 0 to 4095. The suppression coefficient S6 is output as a value from "0" with which a target pixel is completely achromatized, to "1.0" with which achromatization processing is not performed at all, in a predetermined resolution. In the present exemplary embodiment, the suppression coefficient S6 is output in an 8-bit resolution.

In FIG. 9, in the range in which the adjustment gradient S13 is from 0 to 300, the value of the suppression coefficient S6 is 1.0, so that the color blur suppression is not performed. When the adjustment gradient S13 exceeds 300, as the value of the adjustment gradient S13 increases, the value of the suppression coefficient S6 approaches 0, and the color blur suppression gradually becomes stronger. When the adjustment gradient S13 exceeds a certain threshold value, the suppression coefficient S6 becomes 0, and the target pixel is completely achromatized.

The conversion characteristics of the suppression coefficient S6 only needs to be that in which the suppression coefficient S6 monotonously changes according to the adjustment gradient S13, and the change characteristics can be any characteristics as long as the suppression coefficient S6 monotonously changes so that the color blur suppression is more effective. Although the conversion table 805 is described on the assumption that the table includes a read-only memory (ROM), the suppression coefficient S6 based on the adjustment gradient S13 may be calculated by using a function formula.

Figure 10:
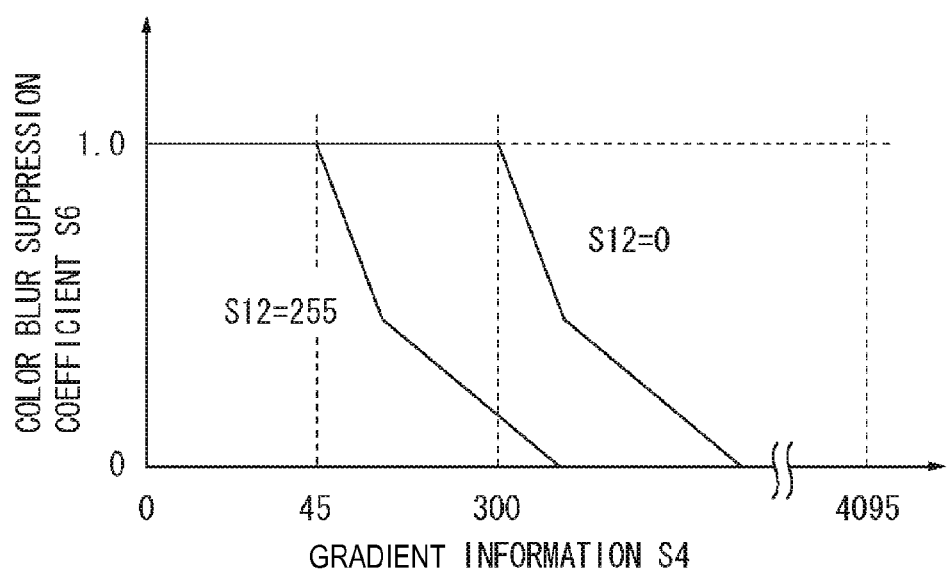
FIG. 10 illustrates conversion characteristics of the suppression coefficient based on gradient information S4 when the image processing apparatus has the conversion characteristics of the suppression coefficient S6 based on the adjustment gradient illustrated in FIG. 9.

FIG. 10 illustrates conversion characteristics of the suppression coefficient S6 based on the gradient information S4 when the image processing apparatus has the conversion characteristics of the suppression coefficient S6 based on the adjustment gradient S13 illustrated in FIG. 9. The adjustment gradient S13 is a value in which the gradient information S4 is added to the second suppression coefficient control parameter S12. Therefore, even when the adjustment gradient S13 is a constant value, the value of the suppression coefficient S6 based on the gradient information S4 changes when the second suppression coefficient control parameter S12 changes.

In FIG. 10, when the second suppression coefficient control parameter S12 is 0, the value of the gradient information S4 and the value of the adjustment gradient S13 correspond to each other, so that the conversion characteristics of the suppression coefficient S6 based on the gradient information S4 is the same as those illustrated in FIG. 9. On the other hand, if the second suppression coefficient control parameter S12 is 255, when the value of the gradient information S4 is smaller than or equal to 45, the value of the suppression coefficient becomes 1.0. When the adjustment gradient S13 exceeds 45, as the value of the adjustment gradient S13 increases, the value of the suppression coefficient S6 approaches 0, and the color blur suppression gradually becomes stronger. When the adjustment gradient S13 exceeds another threshold value, the suppression coefficient S6 becomes 0, and the target pixel is completely achromatized. In other words, these are conversion characteristics in which the conversion characteristics illustrated in FIG. 9 are shifted on the horizontal axis.

As described above, to balance the suppression of the color blur and the protection of the color edge in the subject image, the color blur suppression needs to be suppressed in the low brightness area in which the degree of the suppression of the brightness signal level is small, and the color blur suppression needs to be actively performed in the high brightness area in which the degree of the suppression of the brightness signal level is large.

In the present exemplary embodiment, the smaller the gain-adjusted second suppression coefficient control parameter S12, the larger the value of the gradient information S4 required to perform the color blur suppression. Therefore, this is an effective characteristic for the low brightness area. On the other hand, the larger the gain-adjusted second suppression coefficient control parameter S12, the smaller the value of the gradient information S4 required to perform the color blur suppression. Therefore, this is an effective characteristic for the high brightness area. Considering the above, it is desired that the first suppression coefficient control parameter S11 has a small value in the low brightness area, and has a large value in the high brightness area. When considering the width of the gradient change which is actually seen by a user after the gamma correction processing, it is desired that the first suppression coefficient control parameter S11 changes in a way similar to the gamma correction processing.

Therefore, in the present exemplary embodiment, the brightness conversion circuit 705 has gamma correction characteristics similar to those of the gamma correction units 111 to 113 in FIG. 1. When the setting gain K in FIG. 8 has a value of 1, the value of the adjustment gradient S13 approximately corresponds to the value of the gradient information S4.

As described above, also in the present exemplary embodiment, by considering the width of the gradient change which is actually seen by a user after the gamma correction processing, the color blur suppression is curbed in the low brightness area, and the color blur suppression is actively performed in the high brightness area. By employing such a configuration, the suppression of the color blur in the low gradient area and the protection of the color edge in the subject image can be balanced, and the color blur suppression processing with less failure can be realized.

In the first and second exemplary embodiments, regarding the gamma correction characteristics of the gamma correction units 111 to 113, it has been described that, the brighter the area, the smaller the ratio of the change width of the output signal to the change width of the input signal. However, the present invention is not limited to this. In a configuration in which a user can arbitrarily change the gamma correction characteristics, the same effect as described above can be obtained.

For example, contrary to the first and second exemplary embodiments, the gamma correction units 111 to 113 can have gamma correction characteristics in which the ratio of the change width of the output signal to the change width of the input signal is small in the low brightness area and large in the high brightness area. In this case, it is required that the color blur suppression is controlled to be curbed in the high brightness area, and the color blur suppression is controlled to be actively performed in the low brightness area. In other words, when the gamma correction characteristics are as described above, in the area where the level of the brightness signal is low, the range of the gradient value in which the color blur suppression is not performed (the suppression coefficient is 1) has to be set narrower than that in the area where the level of the brightness signal is high.

The above exemplary embodiments can be realized by software on a computer (or central processing unit (CPU), microprocessing unit (MPU), or the like) not only in a camera, but also in a system or an apparatus. The image data may also be received from a storage medium or via wired/wireless communication, and the color blur suppression and the gamma correction processing may be performed on the image data.

Also, a computer program itself which is provided to a computer so that the computer implements the above exemplary embodiments can realize the present invention.

The computer program for realizing the above exemplary embodiments may be stored in a computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-129196 filed May 28, 2009 and Application No. 2010-039067 filed Feb. 24, 2010, which are hereby incorporated by reference herein in their entirety.

What is claimed is:

1. An image processing apparatus comprising:
   a gradient detection unit configured to detect a gradient value from an image;
   a suppression coefficient calculation unit configured to calculate a suppression coefficient based on the gradient value;

a suppression unit configured to perform image processing to suppress color blur in a suppression target area in the image based on the suppression coefficient; and a gamma correction unit configured to perform gamma correction according to gamma correction characteristics set for the image, wherein the gamma correction characteristics are set such that a ratio of a change width of an output signal to a change width of an input signal when a brightness signal level is in a first range is larger than a ratio of a change width of an output signal to a change width of an input signal when the brightness signal level is in a second range, and the suppression coefficient calculation unit calculates the suppression coefficient so as to cause color blur only in the suppression target area to be suppressed when the gradient value exceeds a threshold value, and sets the threshold value such that a range of the gradient value required to suppress color blur in an area where the brightness signal level is included in the second range in the image is narrower than a range of the gradient value required to suppress color blur in an area where the brightness signal level is included in the first range in the image.

2. The image processing apparatus according to claim 1, wherein the suppression coefficient calculation unit calculates the suppression coefficient such that the degree of color blur suppression when the gradient value is a second value which is larger than the first value is larger than the degree of color blur suppression when the gradient value is a first value.

3. The image processing apparatus according to claim 1, wherein the first range has brightness lower than that of the second range.

4. An image processing apparatus comprising:
a gradient detection unit configured to detect a gradient value from an image;
a suppression coefficient calculation unit configured to calculate a suppression coefficient based on the gradient value;
a suppression unit configured to perform image processing to suppress color blur in a suppression target area in the image based on the suppression coefficient; and
a gamma correction unit configured to perform gamma correction according to gamma correction characteristics set for the image,
wherein the gamma correction characteristics are set such that a ratio of a change width of an output signal to a change width of an input signal when a brightness signal level is in a first range is larger than a ratio of a change width of an output signal to a change width of an input signal when the brightness signal level is in a second range, and
the suppression coefficient calculation unit sets the suppression coefficient such that a degree of color blur suppression in an area where the brightness signal level is included in the second range in the image is stronger than a degree of color blur suppression in an area where the brightness signal level is included in the first range in the image even when the gradient value is the same.

5. The image processing apparatus according to claim 4, wherein the suppression coefficient calculation unit calculates the suppression coefficient such that the degree of color blur suppression when the gradient value is a second value which is larger than a first value is larger than the degree of color blur suppression when the gradient value is a first value.

6. The image processing apparatus according to claim 4, wherein the first range has brightness lower than that of the second range.

7. An image processing method comprising:
detecting a gradient value from an image;
calculating a suppression coefficient based on the gradient value;
performing image processing to suppress color blur in a suppression target area in the image based on the suppression coefficient; and
performing gamma correction according to gamma correction characteristics set for the image,
wherein the gamma correction characteristics are set such that a ratio of a change width of an output signal to a change width of an input signal when a brightness signal level is in a first range is larger than a ratio of a change width of an output signal to a change width of an input signal when the brightness signal level is in a second range, and
calculating the suppression coefficient so as to cause color blur only in the suppression target area to be suppressed when the gradient value exceeds a threshold value in the calculation of the suppression coefficient, and sets the threshold value such that a range of the gradient value required to suppress color blur in an area where the brightness signal level is included in the second range in the image is narrower than a range of the gradient value required to suppress color blur in an area where the brightness signal level is included in the first range in the image.

8. A non-transitory computer-readable storage medium storing a program causing a computer to execute the image processing method according to claim 7.

9. An image processing method comprising:
detecting a gradient value from an image;
calculating a suppression coefficient based on the gradient value;
performing image processing to suppress color blur in a suppression target area in the image based on the suppression coefficient; and
performing gamma correction according to gamma correction characteristics set for the image,
wherein the gamma correction characteristics are set such that a ratio of a change width of an output signal to a change width of an input signal when a brightness signal level is in a first range is larger than a ratio of a change width of an output signal to a change width of an input signal when the brightness signal level is in a second range, and
the suppression coefficient is set such that a degree of color blur suppression in an area where the brightness signal level is included in the second range in the image is stronger than a degree of color blur suppression in an area where the brightness signal level is included in the first range in the image even when the gradient value is the same in the calculation of the suppression coefficient.

10. A non-transitory computer-readable storage medium storing a program causing a computer to execute the image processing method according to claim 9.

* * * * *